Figure 1:
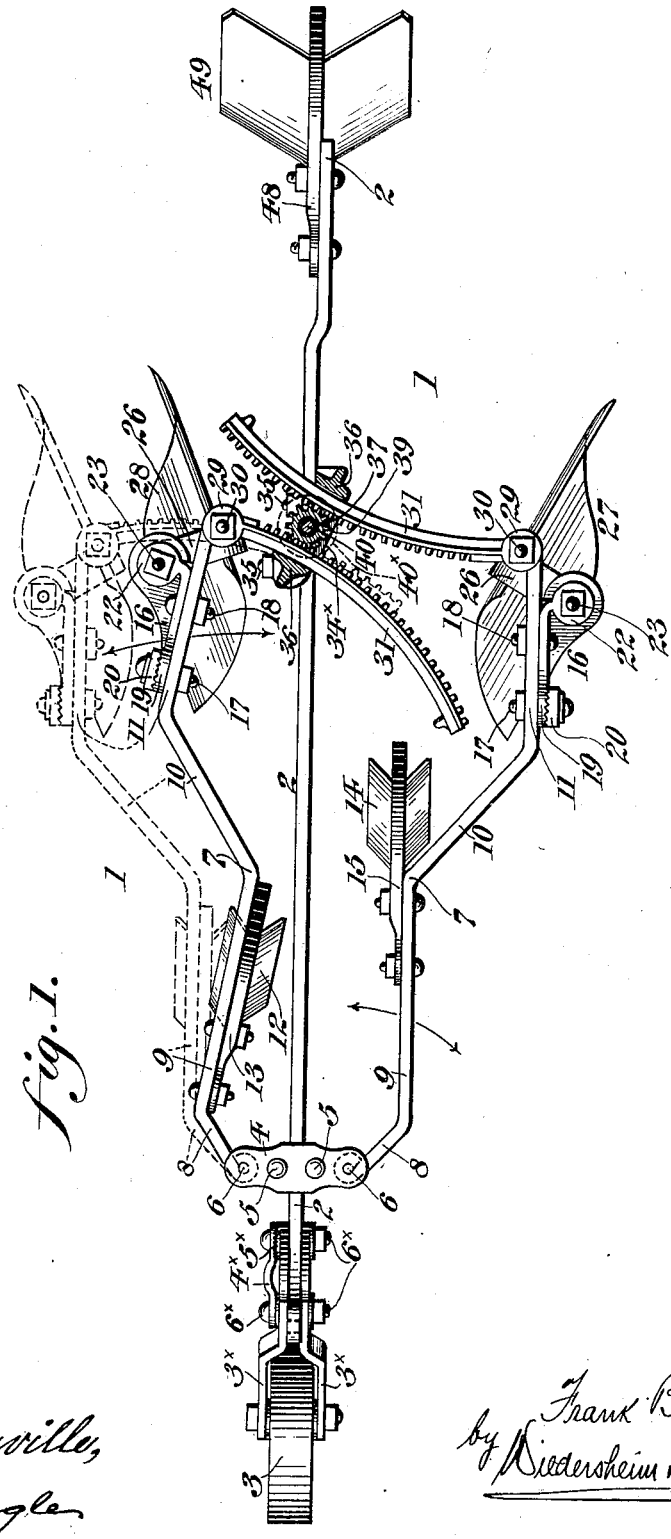

No. 627,965. Patented July 4, 1899.
F. BATEMAN.
HORSE HOE AND CULTIVATOR.
(Application filed Nov. 9, 1898.)
(No Model.) 3 Sheets—Sheet 1.

Witnesses
L. Douville,
P. F. Eagle.

Inventor
Frank Bateman.
by Wiedersheim & Fairbanks,
Attorneys

No. 627,965. Patented July 4, 1899.
F. BATEMAN.
HORSE HOE AND CULTIVATOR.
(Application filed Nov. 9, 1898.)
(No Model.) 3 Sheets—Sheet 2.
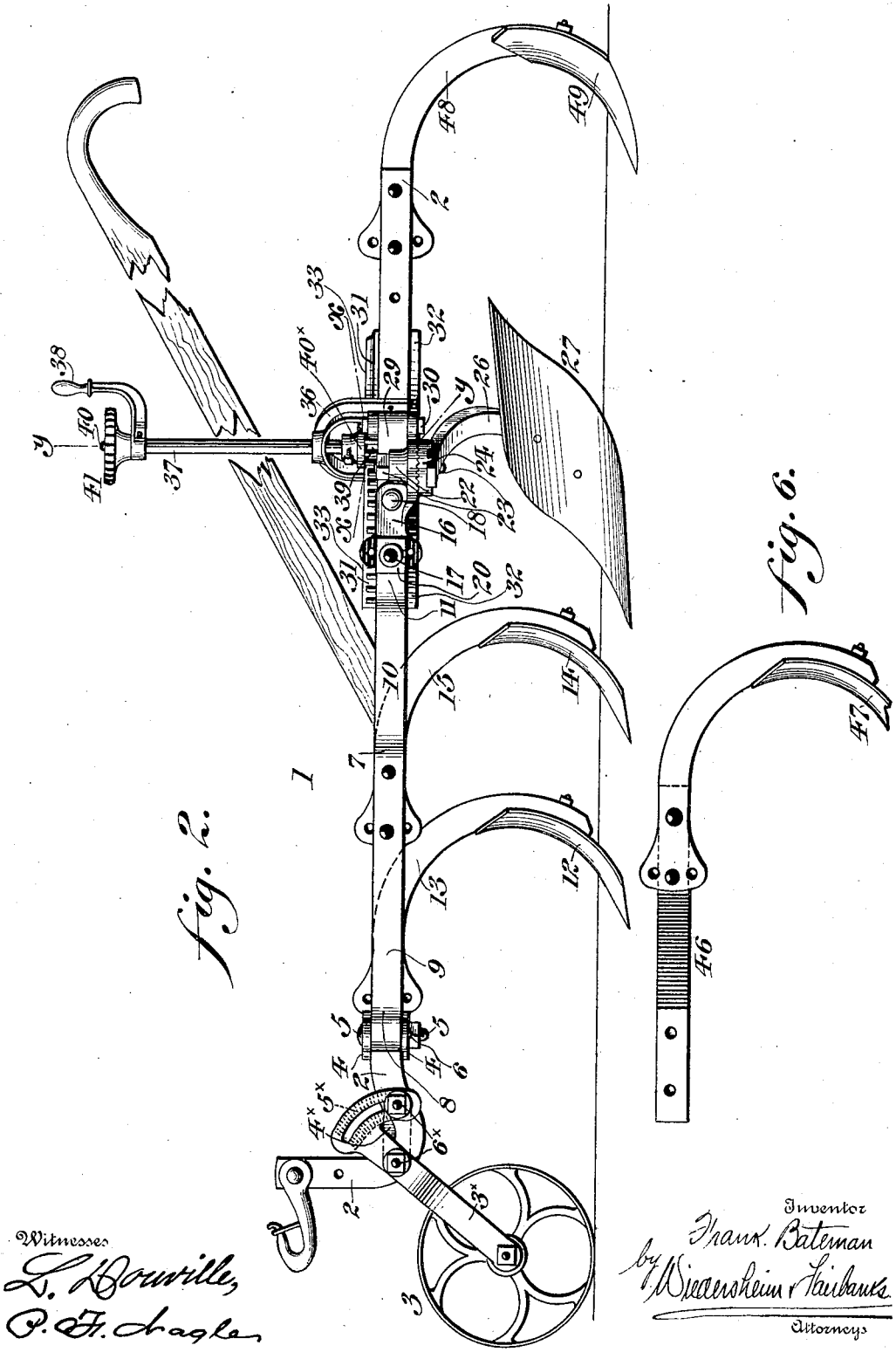

No. 627,965. Patented July 4, 1899.
F. BATEMAN.
HORSE HOE AND CULTIVATOR.
(Application filed Nov. 9, 1898.)
(No Model.) 3 Sheets—Sheet 3.
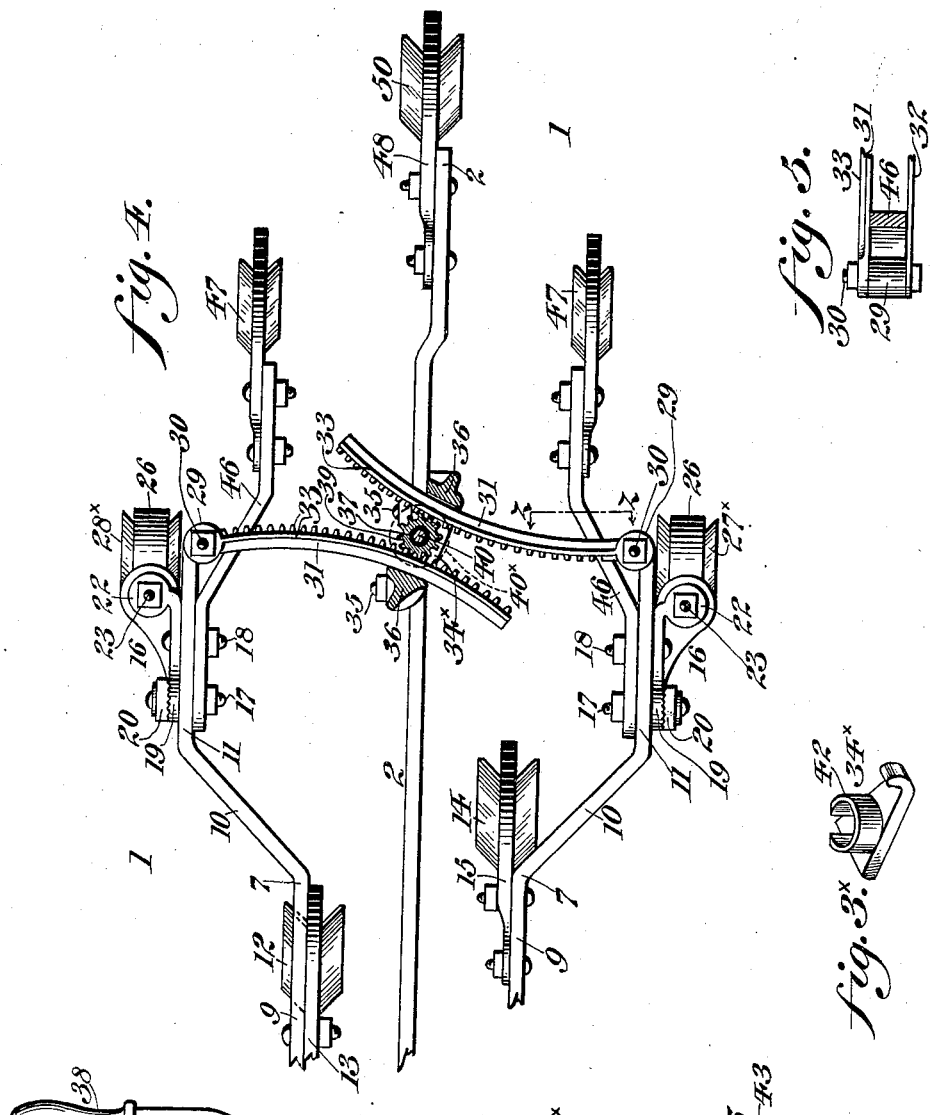
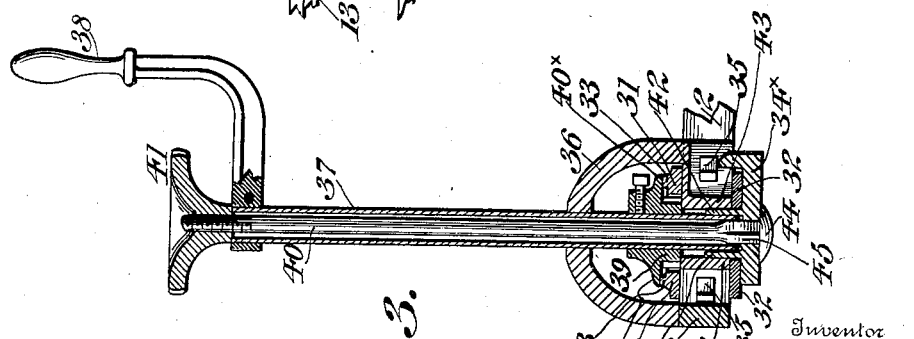
Witnesses
L. Douville,
O. F. Eagles.
Inventor
Frank Bateman
by Wiedersheim & Fairbanks
Attorneys

UNITED STATES PATENT OFFICE.

FRANK BATEMAN, OF GRENLOCH, NEW JERSEY, ASSIGNOR TO THE BATEMAN MANUFACTURING COMPANY, OF NEW JERSEY.

HORSE HOE AND CULTIVATOR.

SPECIFICATION forming part of Letters Patent No. 627,965, dated July 4, 1899.

Application filed November 9, 1898. Serial No. 695,920. (No model.)

*To all whom it may concern:*

Be it known that I, FRANK BATEMAN, a citizen of the United States, residing at Grenloch, in the county of Camden, State of New Jersey, have invented a new and useful Improvement in Horse Hoes and Cultivators, which improvement is fully set forth in the following specification and accompanying drawings.

There has heretofore been objection made to the employment of a five-toothed cultivator by reason of the fact that the rear tooth on each side bar passing closely to the crop leaves an open furrow, which should by all means be closed, this being especially noticeable when the cultivator is open wide or too widely to enable the center tooth or sweep to close this furrow. By the present invention, however, I make provision for the employment of additional teeth whenever necessary or expedient, whereby a furrow-closing or seven-toothed attachment can be employed by securing extra standards with a narrow tooth to the cultivator-frame in the rear of and on the inside of the second tooth, said seven-toothed arrangement not only filling in the open furrow, but more thoroughly pulverizing the soil.

To the above ends my invention consists of an improved construction of horse hoes and cultivators in which provision is made for the employment of five or seven teeth, according to requirements, novel means being also provided for enabling the outer portions or expander-bars of the cultivator-frame to be moved toward or away from each other, and means being also provided for independently shifting the position of either of the outer frames with relation to the central portion of the cultivator-frame.

My invention further consists in the employment of ratchet-castings, by means of which the horse-hoe standards are adjustably attached to the cultivator bars or frame, thereby making a very firm connection and one capable of withstanding severe shocks without injuring said castings, this construction being adapted to give easy adjustment to the side hoes not only sidewise, but also in angle of pitch, said adjustment also permitting of the side hoes being entirely reversed for hoeing or for covering purposes, said hoes pointing forward or transversely, as may be desired, and being further enabled to be brought into immediate contact with each other by reversing the ratchet-castings and placing them on the inside of the side bars, in which the latter shape the tool is applicable for opening furrows for manure or other purposes.

My invention further consists of a novel construction of rack-and-pinion mechanism for readily changing the expander-bars while in motion or at rest from their extreme to narrowest width, provision being made for locking the expanding device in any suitable manner, the racks being curved, and consequently made shorter than heretofore.

It further consists of novel details of construction, all as will be hereinafter fully set forth and particularly pointed out in the claims.

Figure 1 represents a plan view of a horse hoe and cultivator embodying my invention. Fig. 2 represents a side elevation of Fig. 1. Fig. 3 represents a vertical sectional view taken on line $y\ y$, Fig. 2, showing the construction of the expanding device and its adjuncts. Fig. $3^\times$ represents a perspective view of certain portions of Fig. 3 in detached position. Fig. 4 represents a plan view of Fig. 1, partly in section, showing the tool adapted to be used as a seven-toothed cultivator, the section being taken on line $x\ x$, Fig. 2. Fig. 5 represents a section on line $z\ z$, Fig. 4. Fig. 6 represents a side elevation of a cultivator-tool and its standard, the latter being adapted to be bolted in the rear of and on the inside of the second tooth, as will be hereinafter explained.

Similar numerals of reference indicate corresponding parts in the figures.

Referring to the drawings, 1 designates a cultivator, the same having a suitable framework, which consists of a central bar 2, from the forward portion of which is supported the wheel 3.

4 designates upper and lower plates, which are suitably secured to the forward end of the central bar 2 by means of the bolts 5 or other devices in such manner that the shifting of said plates 4 is prevented.

6 designates pins, on which are mounted the forward extremities of the side expanding-bars 7, the latter being pivotally mounted upon said pins and consisting of the deflected member 8, having a portion 9 continuing therefrom, which latter has the deflected portion 10, which is continued to form the portion 11, the portions 9 and 11 being substantially parallel in the present instance.

12 designates the forward cultivator-tooth, which is attached to its bar by the standard 13, the opposite movable bar of the cultivator-frame having the tooth 14 attached thereto through the medium of the standard 15.

16 designates arms or castings which are located in the rear of the tooth 14 and are attached to either side of the portions 11 of the movable side expanding-bar 7 by means of the bolts 17 and 18, said bolts 17 passing through the portion 19, adjacent to which is located the block or washer 20, said parts 19 and 20 having contiguous roughened surfaces or ratchet-teeth and being held in adjusted position by means of said bolts 17, said arms being rocked or adjusted on the bolt 18.

The portion 22 of the casting 16 has the bolt 23 passing therethrough, said bolt holding in position the head 24, the contacting surfaces of said portions 22 and 24 having the standard 26 depending therefrom, to which is attached the side hoe 27, it being evident that the parts 22 and 24 are held in juxtaposition by means of the bolt 23.

28 designates a side hoe similar to the side hoe 27, attached to the opposite movable bar of the frame of the tool, as will be evident from Fig. 1.

The extremity 29 of each of the movable side expanding-bars 7 has a bolt 30 passing therethrough, said bolt also passing through the extremities of the upper toothed segment 31 and the lower curved strip 32, said upper segment having a raised portion or rim 33, which extends longitudinally thereof, the object of which will be explained, while said lower curved strips or bars 32 are supported in suitable recesses in the block or strap $34^\times$, located under the bar 2.

36 designates a yoke which is suitably supported on the central bar 2 by means of the bolts 35 and has arising therefrom the sleeve 37, which is suitably journaled at its lower portion and has the handle 38 attached to the upper portion thereof, said sleeve 37 having the pinion 39 attached thereto by a set-screw or otherwise, said pinion being provided with a flange $40^\times$, adapted to rest and be clamped upon the raised portion or ribs 33 of the segments 31, as will be best understood from Fig. 3, it being of course understood that said sleeve 37 and pinion 39 rotate in unison.

40 designates an upright rod located within the sleeve 37 and carrying on its upper portion the hand-wheel 41, which is adapted to be tightened upon the upper portion of the sleeve 37, as will be apparent from Fig. 3.

The portion $34^\times$ has a sleeve 42 arising therefrom, which is held between the lower portion of the sleeve 37 and the adjacent wall 43, said portion $34^\times$ being held in position by means of the head 44 upon the end of the rod 40, the latter being provided with a squared portion 45, which passes through a similarly-shaped opening in the part $34^\times$, whereby independent movement of the rod 40 and said strap $34^\times$ is prevented.

46 designates an extra bracket, which is adapted to be bolted to the portion 11 of the side expanding-bar 7 on the inside thereof and on the inside of the second tooth 27 and 28, said standard carrying the narrow tooth 47, the general relative position of the same being apparent from Fig. 4, it being of course understood that a pair of teeth 47 are employed.

48 designates a standard, the latter being adapted to be bolted to the rear extremity of the central bar 2 of the tool and to have a hoe 49 or a tooth 50 attached thereto, as is evident.

The operation is as follows: When the parts are in the position seen in Figs. 1 or 2, the tool is adapted to be used as a five-toothed cultivator, and it will be apparent that by adjusting the supporting devices or ratchet-castings for the side hoes 27 and 28 said hoes can be turned sidewise upon loosening the bolts 23, and by the proper manipulation of the bolts 17 the inclination of the ratchet-castings can be varied, the above adjustments also permitting of the side hoes being entirely reversed for hoeing or for covering purposes. With the point forward they can be quickly changed from side to side, if desired.

The side hoes 27 and 28 can be brought into immediate contact with each other by placing the ratchet-castings in a reversed position on the inside of the side bars, in which condition the tool is capable of doing excellent work—opening furrows for manure or other purposes—it being understood that this desirable feature of opening and closing the tool from either extreme position can be readily accomplished by the manipulation of the device seen especially in Fig. 3.

When it is desired to increase or diminish the width of the tool, the hand-wheel 41 is loosened and the handle 38, sleeve 37, and pinion 39 are rotated, whereupon the toothed segments or racks 31 will be moved in unison, as is evident.

When for any reason it may be desirable that one of the side expanding-bars 7 shall occupy a position nearer to the central bar 2 than the opposite bar 7, which is necessary for certain work, it is only necessary to unscrew the hand-wheel 41 sufficiently to enable the handle 38, sleeve 37, and pinion 39 to be lifted, so as to temporarily clear the teeth of the racks 31, whereupon it will be evident that the desired side bar 7 may be pushed inwardly from the position seen in dotted lines in Fig. 1 to the position seen in full lines in the same figure or to any intermediate portion desired, whereupon the pinion 39 is dropped again into the position seen in Fig. 3, and the hand-wheel 41 then turned to its proper or normal position and clamped, whereby the desired locking of the movable side bars 7 is readily effected.

When it is desired to adapt the tool seen in Figs. 1 and 2 so that the same can be used as a seven-toothed cultivator, it is only necessary to insert the bracket 46 between the segments 31 and the strip 32 in the manner indicated in Figs. 4 and 5, each of said brackets then being clamped to the portions 11 of the movable side bar 7 by means of the bolts 17 and 18, as will be understood from Fig. 4. It will thus be seen that in a simple and expeditious manner I can convert a five-toothed cultivator into a seven-toothed cultivator by the provision of the narrow teeth 47, (seen in Fig. 6,) which same are bolted in the rear of and on the inside of the narrow cultivator-teeth, which in Fig. 4 are indicated at $27^\times$ and $28^\times$, the two latter taking the place of the side hoes 27 and 28. (Seen in Figs. 1 and 2.) It will be apparent that by this provision of the two additional teeth 47, located substantially as described, the open furrow will be nicely filled in and the soil will be more thoroughly pulverized.

It will of course be understood that the side hoes 27 and 28 can be readily replaced by narrow cultivator-teeth, according to requirements.

I am aware that it is not new to adjust the angle of the hoes by a pivotal ratchet adjustment, but believe it to be novel to adjust the pitch by means of an auxiliary ratchet or serrations, substantially as hereinbefore described.

It will thus be seen from the foregoing that by my invention I have produced a tool which is adapted to be used as a horse-hoe or as a five-toothed cultivator or a seven-toothed cultivator, provision being made for enabling the side hoes or the movable side frames to be readily adjusted toward or away from each other, or, if desired, one of the adjustable expanding-bars can be moved toward or away from the central bar of the cultivator-frame independently of the opposite movable bar, as has been explained. The bars 31, with teeth thereon, form the toothed segments heretofore referred to, the segmental form of the same permitting them to fold or move inwardly to a greater extent than where inwardly-brought rack-bars are used, since, as will be seen in Figs. 1 and 4, said segments move to the front and rear when drawn in and so occupy less space in lateral direction, admitting of making the implement of reduced width.

The implement can be raised or lowered by the adjustment of the wheel 3, which is journaled in the hangers $3^\times$, said hangers being pivoted to the central bar 2, as best seen in Fig. 2. The upper portion of one of the hangers $3^\times$ is slotted and roughened, as at $5^\times$, in order that the same may engage with a roughened portion on a bar $4^\times$, which latter is supported by the bolts $6^\times$, so that the hangers $3^\times$, and consequently the wheel 3, may be firmly held in adjusted position, whereby slipping of said hangers is prevented.

Having thus described my invention, what I claim as new, and desire to secure by Letters Patent, is—

1. In a device of the character described, a suitable framework, the same having adjustable expanding-bars, racks attached to said bars, a pinion located intermediate of said racks for actuating the latter and means for adjusting one of said bars independently of the other bar.

2. In a device of the character named, a central bar, movable side bars attached thereto, racks mounted on said side bars and extending inwardly therefrom, a pinion common to said racks, a yoke suitably supported, a sleeve having a handle attached thereto, and rotatably mounted in said yoke, a rod located within said sleeve and provided with a clamping device or hand-wheel, said pinion being attached to said sleeve, and fastening devices for said yoke.

3. In a tool of the character named, a plurality of side expander-bars, racks attached thereto and projecting inwardly therefrom, each of said racks having a raised portion or rib, a pinion common to said racks, said pinion having a flange overhanging and engaging the upper faces of said ribs, means for actuating said pinion and means for locking the latter.

4. In a tool of the character named, a pair of movable side expander-bars, having mounted thereon teeth 12 and 14, a central bar carrying a tooth 50, detachable rearwardly-extending brackets 46 attached to and forming rear extensions of said expanding-bars and provided with teeth 47, a pinion suitably supported upon said central bar, racks projecting inwardly from said side bars and engaging said pinion and means for disconnecting said brackets without necessitating dismantling of the other parts of the tool.

5. In a tool of the character named, side expanding-bars, racks extending inwardly therefrom, inwardly-projecting strips located under said racks, a support for the latter and said strips, a yoke suitably sustained, a sleeve carrying a handle, rotatably mounted in said yoke, a non-rotatable rod located in said sleeve, a pinion carried by the latter and having a flange engaging the surface of said racks, and a hand-wheel carried by said rod.

6. In a tool of the character named, a side bar, an arm 16, secured thereto by a bolt 18, a bolt 17, a plurality of openings in the portion 19 of said arm, through which said bolt passes in its adjusted positions, a block 20 through which said bolt 17 passes, said block and portion 19 having their contacting faces roughened, a head 24 attached to said arm and fastening devices for said head.

FRANK BATEMAN.

Witnesses:
WM. C. WIEDERSHEIM,
E. HAYWARD FAIRBANKS.